United States Patent Office 3,549,721
Patented Dec. 22, 1970

3,549,721
CYCLOPENTADIENE REMOVAL IN ISOPRENE
PURIFICATION BY AMPLIFIED DISTILLATION
George E. Sholtis, Akron, and Wallace E. Morrow, Kent,
Ohio, assignors to The Goodyear Tire & Rubber Company, Akron, Ohio, a corporation of Ohio
No Drawing. Continuation-in-part of application Ser. No. 759,243, Sept. 11, 1968. This application Nov. 20, 1969, Ser. No. 878,574
Int. Cl. B01d 3/00; C07c 7/00
U.S. Cl. 260—681.5                                   2 Claims

ABSTRACT OF THE DISCLOSURE

There is disclosed a process of lowering the cyclopentadiene-1,3 content of a hydrocarbon stream containing at least 50 percent by weight of isoprene. The process comprises adding to such stream at least 10 percent of a mixture of 2-pentene and 2-methyl-2-butene containing at least 3 percent of 2-pentene and 5 percent of 2-methyl-2-butene, and subjecting the mixture of isoprene, cyclopentadiene, 2-pentene and 2-methyl-2-butene to fractional distillation and recovering therefrom an overhead stream containing at least 90 percent by weight of isoprene and less than 5 parts per million of cyclopentadiene.

---

This application is a continuation-in-part of application Ser. No. 759,243, filed Sept. 11, 1968, and entitled Isoprene Purification now abandoned.

This invention relates to a process for the purification of isoprene. More specifically, it relates to a process to produce isoprene of a purity as to be successfully polymerizable with coordination catalysts which comprise mixtures of organoaluminum compounds and transition metal halides to form high cis 1,4 polyisoprene, the equivalent of natural rubber.

It is known that isoprene can be polymerized to form an extremely high percentage of polyisoprene in a cis 1,4 structure. Cis 1,4 polyisoprene is the structure identical to that of natural rubber. The sterospecific catalyst systems which have been discovered to polymerize isoprene to high cis 1,4 polyisoprene are mixtures of organometallic compounds such as aluminum trialkyls or aluminum trialykyl aromatic etherates and transition metal halides such as titanium tetrachloride.

However, it is known that such catalysts are adversely affected by extremely small amounts of certain impurities found in the isoprene. For instance, such things as cyclic diolefins, the prime example of which is cyclopentadiene-1,3 has an extremely adverse effect on the polymerization rate, the catalyst consumption and the desirable polymer properties, if present, even in low concentrations.

It has been observed that the concentration of cyclopentadiene-1,3 (hereinafter sometimes referred to as CPD) must be no greater than about one part per million (ppm) maximum, and preferably 0.5 p.p.m. in the isoprene, if such isoprene is to be employed in a successful commercial cis 1,4-polyisoprene operation. While it is possible, by utilizing excessive amounts of catalyst, which is expensive, to polymerize isoprene containing substantially more CPD than one p.p.m., the poymerization rates are too slow and the polymer properties are too adversely affected to constitute a successful commercial operation to supply cis 1,4 polyisoprene equivalent to that of natural rubber.

Isoprene, which is 2-methyl-1,3-butadiene, can be obtained from several sources. One such source is the isolation of isoprene from a naphtha cracking process. Another possible source of isoprene is the catalytic dehydrogenation of methyl butane or methyl butenes. Both of these raw isoprene streams have been found to contain substantial amounts of CPD. For instance, a typical stream coming from the dehydrogenation of isopentane would have approximately the following composition in weight percent. approximately the following composition in weight percent:

Unreacted isopentane _____ 58
Isoprene _____ 13.8
Piperylene _____ 2.2
Methyl butenes _____ 21.3
Cyclopentadiene _____ 0.5 the remainder being various other hydrocarbons.

In actual commercial operation such a stream would be fed to an extractive distillation unit to increase the isoprene values in the stream. A typical stream resulting from an extractive distillation of such a stream would have approximately the following composition in weight percent:

Isoprene _____ 80.9
Piperlyene _____ 13.6
Cyclopentadiene-1,3 _____ 2.7
Methyl butenes _____ 2.5 the remainder being various other unsaturated hydrocarbons.

Thus, it can be seen that the extractive distillation step not only removed the saturated hydrocarbons found in the dehydrogenation stream, it has increased the isoprene concentration considerably over that of dehydrogenation stream from about 13.8% to about 80.9%. At the same time, however, the cyclopentadiene content has been increased more than five fold from about 0.5% to 2.7%.

The normal procedure following extractive distillation would be to send the stream to a fractionating column. However, it has been found that the fractionation of the stream from the extractive distillation units, while upgrading the isoprene, will not reduce the cyclopentadiene content to an acceptable level.

For instance, if the stream resulting from the extractive distillation unit is subjected to a fractional distillation under conditions which would upgrade the isoprene purity from approximately 81% to 98.5% weight percent, the approximate composition of the overhead product after being subjected to this type of purification system is in weight percent as follows:

Isoprene _____ 98.5
Methyl butenes _____ 0.2
Other unsaturated hydrocarbons _____ 1.3
Cyclopentadiene-1,3 _____ 100 p.p.m.

Thus, it is evident that a straight fractional distillation of such a stream, even though it increases the isoprene purity from approximately 81% to 98.5% and reduces the cyclopentadiene content from 2.7% to 100 p.p.m., it still does not remove enough cyclopentadiene to provide isoprene containing only about 1 part per million of cyclopentadiene which can be polymerized to form a high cis 1,4 polyisoprene on a commercial scale utilizing these stereospecific catalyst systems which comprise aluminum alkyl compounds and titanium tetrachloride.

Therefore, it is an object of this invention to provide a method whereby cyclopentadiene 1,3 can be effectively removed from a stream containing isoprene and cyclopentadiene. Another object is to provide a method whereby isoprene which is polymerizable by stereospecific catalyst systems to form high cis 1,4-polyisoprene is obtained. Another object is to provide a method whereby cyclopentadiene can be effectively removed by fractional distillation from a stream containing both isoprene and cyclopentadiene-1,3. Other objects will appear as the description proceeds.

It has been unexpectedly discovered that the cyclopentadiene-1,3 content in an isoprene-containing stream can be substantially reduced by a method which comprises adding to said isoprene and cyclopentadiene-1,3 containing stream, at least 10 percent of a mixture of 2-pentene and 2-methyl-2-butene wherein said mixture contains at least 3 percent of 2-pentene and 5 percent of 2-methyl-2-butene, all percentages being by weight of the total weight of said stream and subsequently fractionally distilling said stream containing isoprene, cyclopentadiene-13,3,2-pentene and 2-methyl-2-butene and recovering therefrom an overhead stream containing isoprene at a higher purity and containing substantially less cyclopentadiene-1,3 than originally present in said stream.

The invention can be illustrated by reference to the following examples which are intended to be representative and not restrictive of the scope of the invention. In these examples all amounts are in weight percent unless otherwise indicated, such as parts per million (p.p.m.). All of the analyses were obtained by conventional gas chromatographic techniques. In these examples, the fractional distillations were conducted under identical conditions as is possible.

The distillation column employed in these examples had an inside diameter of 16 millimeters and contains 9 feet of 3/32 inch stainless-steel helices. The column was operated at a reflux ratio of 125/1 under conditions approximately atmospheric and temperatures ranging from about 34.5 to about 35.5 so that this column would be equivalent to approximately 56—56 theoretical plates.

EXAMPLE I

A mixture was prepared having the following composition in weight percent and was subjected to fractional distillation:

| | |
|---|---|
| Isoprene | 88.18 |
| 2-pentene | 6.10 |
| 2-methyl-2-butene | 5.65 |
| Cyclopentadiene-1,3 | 0.02 |

A representative sample taken from the overhead after the column had been in operation for about six hours had the following composition in weight percent:

| | |
|---|---|
| Isoprene | 98.94 |
| 2-pentene | 1.05 |
| 2-methyl-2-butene | None |
| Cyclopentadiene-1,3 | None |

EXAMPLE II

A mixture was prepared having approximately the following composition in weight percent and was subjected to fractional distillation:

| | |
|---|---|
| Isoprene | 88.3 |
| 2-pentene | 5.9 |
| 2-methyl-2-butene | 5.4 |
| Clclopentadiene-1,3 | 0.5 |

After the column had been in operation approximately three hours a representative sample of the overhead had the following composition in weight percent:

| | |
|---|---|
| Isoprene | 99.88 |
| 2-pentene | 0.12 |
| 2-methyl-2-butene | None |
| Cyclopentadiene-1,3 | None |

EXAMPLE III

A mixture was prepared having approximately the following composition in weight percent and was subjected to fractional distillation:

| | |
|---|---|
| Isoprene | 88.1 |
| 2-pentene | 6.0 |
| 2-methyl-2-butene | 5.4 |
| Cyclopentadiene-1,3 | 0.5 |

After the column had been in operation for approximately six hours, a representative sample of the overhead had the following composition by weight:

| | |
|---|---|
| Isoprene | 99.3 |
| 2-pentene | 0.7 |
| 2-methyl-2-butene | None |
| Cyclopentadiene-1,3 | None |

Thus, it can be seen that by reference to Examples I, II and III that a rather substantial amount of cyclopentadiene can be removed from the raw isoprene streams with the aid of a mixture of 2-pentene and 2-methyl-2-butene.

To further illustrate the practice of this invention, the following examples are presented. These examples consist of continuous fractional distillations and are intended to be representative rather than restrictive of this invention.

EXAMPLE IV

In a fractionating column containing 300 actual plates operated at a 20/1 reflux ratio thereby having an equivalent of 210 theoretical plates, there was continuously fractionated a feed consisting of the following composition in weight percent:

| | |
|---|---|
| Isoprene | 62.0 |
| 2-pentene | 7.9 |
| 2-methyl-2-butene | 25.4 |
| Cyclopentadiene-1,3 | 0.8 |

An overhead of the following composition in weight percent was obtained:

| | |
|---|---|
| Isoprene | 97.3 |
| 2-pentene | 2.1 |
| 2-methyl-2-butene | None |
| Cyclopentadiene-1,3 | None |

EXAMPLE V

In a column containing 300 actual plates and operated under a reflux ratio of 20/1 thereby equivalent to 210 theoretical plates, there was fractionated continuously a feedstock containing the following composition in weight percent:

| | |
|---|---|
| Isoprene | 67.1 |
| 2-pentene | 4.5 |
| 2-methyl-2-butene | 12.0 |
| Cyclopentadiene-1,3 | 0.8 |

There was removed from the overhead of this column a stream containing the following composition in weight percent:

| | |
|---|---|
| Isoprene | 96.6 |
| 2-pentene | 3.4 |
| 2-methyl-2-butene | None |
| Cyclopentadiene-1,3 | Less than 0.1 p.p.m. |

Thus, the practice of this invention is illustrated in a commercial continuous process and thereby provides a commercial grade isoprene polymerizable with the new stereospecific catalyst systems to form a commercially acceptable high cis 1,4 polyisoprene.

While the examples illustrating the practice of this invention set forth in this specification employ certain specific types of fractional distillation equipment, those skilled in the art can readily adapt the practice of this invention to other fractional distillation equipment by using such well known techniques as the Gilliland correlation found in Industrial Engineering Chemistry, 32, 1220 (1940). Those skilled in the art of fractional distillation may also adapt the practice of this invention to other fractional distillation equipment employing other well known techniques.

As can be seen from the foregoing discussion and experiments, substantially all of the cyclopentadiene can be removed effectively according to the practice of this invention. However, as a practical matter, the practice of this invention should be considered only to be employed with a stream containing at least 50 percent by weight of isoprene. If the isoprene stream does not contain at least 50 percent by weight of isoprene, it is uneconomical to subject it to fractional distillation. The isoprene values of such streams can be upgraded in a more economical fashion by resorting to simple distillations or extractive distillations to increase the isoprene content of streams which are to be fractionally distilled. Also, it is preferred that the overhead stream after fractionation in accordance with the practice of this invention, contains at least 90 percent isoprene and less than 5 parts per million of cyclopentadiene. Most feed streams containing at least 50 percent by weight of isoprene will also contain much more than 5 parts per million of cyclopentadiene when subjected to the practice of this invention. Thus, in the practice of this invention it is usually preferred to fractionally distill a hydrocarbon stream containing from about 60 to about 70 percent by weight of isoprene and employ from about 4 to about 10 percent by weight of 2-pentene and from about 10 to about 30 percent by weight of 2-methyl-2-butene. It is also preferred to operate in a manner so that the cyclopentadiene content of the overhead stream is no greater than about 5 parts per million with one part per million being more preferred.

While certain representative embodiments and details have been shown for the purpose of illustrating the invention, it will be apparent to those skilled in this art that various changes and modifications may be made therein without departing from the spirit or scope of the invention.

What is claimed is:
1. The process of lowering the cyclopentadiene-1,3 content of a hydrocarbon stream which contains isoprene and cyclopentadiene-1,3 which comprises adding to a hydrocarbon stream containing at least 50 percent by weight of isoprene and more than 5 parts per million of cyclopentadiene-1,3, at least 10 percent percent of a mixture of 2-pentene and 2-methyl-2-butene wherein said mixture contains at least 3 percent of 2-pentene and 5 percent of 2-methyl-2-butene, all percentages being by weight of the total weight of said stream, and subjecting the mixture of isoprene, cyclopentadiene-1,3, 2-pentene and 2-methyl-2-butene to fractional distillation and recovering therefrom an overhead stream containing at least 90 percent of isoprene and less than 5 parts per million of cyclopentadiene.

2. The process according to claim 1 in which the mixture fractionally distilled contains from about 60 to about 70 weight percent of isoprene and from about 4 to about 10 percent by weight of 2-pentene and from about 10 to about 30 percent by weight of 2-methyl-2-butene.

References Cited
UNITED STATES PATENTS

| | | | |
|---|---|---|---|
| 2,231,241 | 2/1941 | Bailey | 203—52 |
| 2,704,778 | 3/1955 | Maisel | 260—666 |
| 2,614,969 | 10/1952 | Morrell et al. | 203—70X |
| 2,851,505 | 9/1958 | Henke et al. | 260—681.5 |
| 3,301,915 | 1/1967 | Icing et al. | 260—681.5 |

OTHER REFERENCES

A. W. Weitkamp, "The Amplified Distillation of Methyl Esters of Fatty Acids," J. Am. Oil Chemists, 236–238 (July 1947).

DELBERT E. GANTZ, Primary Examiner

G. E. SCHMITKONS, Assistant Examiner

U.S. Cl. X.R.
203—52, 70